(12) United States Patent
Liu et al.

(10) Patent No.: US 8,902,507 B2
(45) Date of Patent: Dec. 2, 2014

(54) MAN-MADE COMPOSITE MATERIAL AND MAN-MADE COMPOSITE MATERIAL ANTENNA

(75) Inventors: Ruopeng Liu, Guangdong (CN); Chunlin Ji, Guangdong (CN); Yutao Yue, Guangdong (CN)

(73) Assignees: Kuang-Chi Innovative Technology Ltd., FuTian District, Shenzhen, Guangdong (CN); Kuang-Chi Institute of Advanced Technology, Nanshan District, Shenzhen, Guangdong (CN)

( * ) Notice: Subject to any disclaimer, the term of this patent is extended or adjusted under 35 U.S.C. 154(b) by 189 days.

(21) Appl. No.: 13/522,964
(22) PCT Filed: Nov. 16, 2011
(86) PCT No.: PCT/CN2011/082303
§ 371 (c)(1), (2), (4) Date: Jul. 19, 2012
(87) PCT Pub. No.: WO2013/016906
PCT Pub. Date: Feb. 7, 2013

(65) Prior Publication Data
US 2013/0027782 A1    Jan. 31, 2013

(30) Foreign Application Priority Data

| Jul. 29, 2011 | (CN) | 2011 1 0216541 |
| Jul. 29, 2011 | (CN) | 2011 1 0216631 |
| Jul. 29, 2011 | (CN) | 2011 1 0216677 |
| Jul. 29, 2011 | (CN) | 2011 1 0216693 |
| Jul. 29, 2011 | (CN) | 2011 1 0216711 |

(51) Int. Cl.
*G02B 3/00*    (2006.01)
(Continued)

(52) U.S. Cl.
CPC .............. *G02B 3/0087* (2013.01); *H01Q 15/02*
(Continued)

(58) Field of Classification Search
USPC ............ 359/288, 237, 642, 620, 321, 341.32, 359/586, 652; 343/761, 757; 455/101; 250/339.05, 482.1, 503.1
See application file for complete search history.

(56) References Cited

U.S. PATENT DOCUMENTS

2008/0165079 A1* 7/2008 Smith et al. ............... 343/911 R
(Continued)

FOREIGN PATENT DOCUMENTS

EP    1739946 A1 *  1/2007

OTHER PUBLICATIONS

Invisibility cloak without singularity Wei Xiang Jing, Tie Jun Cui, Xin Mi Yang, Qiang Cheng, Ruopeng Liu, David R. Smith Submitted on Sep. 13, 2008 (v1), last revised Oct. 25, 2008 (v2).*

*Primary Examiner* — Scott J Sugarman
*Assistant Examiner* — Mustak Choudhury
(74) *Attorney, Agent, or Firm* — Winston Hsu; Scott Margo (57) ABSTRACT

The present invention relates to a man-made composite material and a man-made composite material antenna. The man-made composite material is divided into a plurality of regions. An electromagnetic wave is incident on a first surface exits from a second surface of the man-made composite material opposite to the first surface. A line connecting a radiation source to a point on the bottom surface of the $i^{th}$ region and a line perpendicular to the man-made composite material form an angle $\theta$ therebetween, which uniquely corresponds to a curved surface in the $i^{th}$ region. A set formed by points on the bottom surface of the $i^{th}$ region that have the same angle $\theta$ forms a boundary of the curved surface to which the angle $\theta$ uniquely corresponds. The refraction, diffraction and reflection of the present invention at the abrupt transition points can be reduced.

20 Claims, 7 Drawing Sheets (51) Int. Cl.
*G02B 7/00* (2006.01)
*G02B 9/00* (2006.01)
*G02B 11/00* (2006.01)
*G02B 13/00* (2006.01)
*G02B 15/00* (2006.01)
*G02B 17/00* (2006.01)
*G02B 25/00* (2006.01)
*G02F 1/00* (2006.01)
*H01S 3/00* (2006.01)
*G02B 1/10* (2006.01)
*G02B 27/10* (2006.01)
*H01Q 15/02* (2006.01)
*H01Q 19/06* (2006.01)

(52) U.S. Cl.
CPC ................ (2013.01); *H01Q 19/065* (2013.01)
USPC ...... 359/642; 359/321; 359/341.32; 359/586; 359/620; 359/652

(56) References Cited

U.S. PATENT DOCUMENTS

2009/0296223 A1* 12/2009 Werner et al. .................. 359/641
2012/0019892 A1* 1/2012 Bowers et al. ................ 359/276

MAN-MADE COMPOSITE MATERIAL AND MAN-MADE COMPOSITE MATERIAL ANTENNA

FIELD OF THE INVENTION

The present invention generally relates to the field of electromagnetic technologies, and more particularly, to a man-made composite material and a man-made composite material antenna.

BACKGROUND OF THE INVENTION

Figure 1:
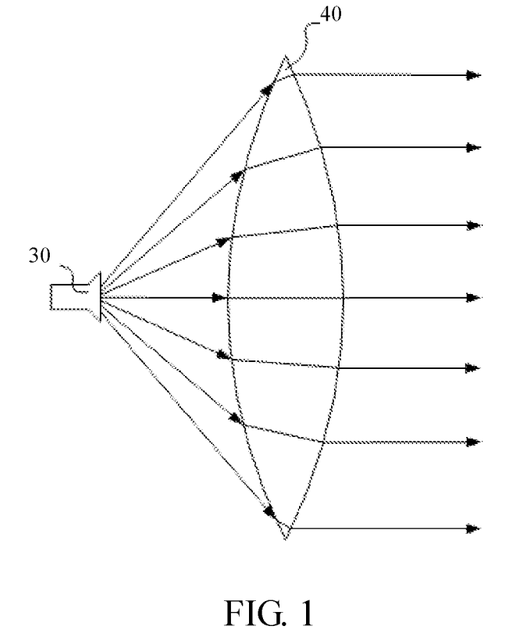
FIG. 1 is a schematic view illustrating a conventional spherical lens which is converging an electromagnetic wave.

In conventional optics, a lens can be used to refract a spherical wave, which is radiated from a point light source located at a focus of the lens, into a plane wave. Currently, the converging effect of the lens is achieved by virtue of the refractive property of the spherical form of the lens. As shown in FIG. 1, a spherical wave emitted by a radiator 30 is converged by a spherical lens 40 and exits in the form of a plane wave. The inventor has found in the process of making this invention that, the lens antenna has at least the following technical problems: the spherical lens 40 is bulky and heavy, which is unfavorable for miniaturization; performances of the spherical lens 40 rely heavily on the shape thereof, and directional propagation from the antenna can be achieved only when the spherical lens 40 has a precise shape; and serious interferences and losses are caused to the electromagnetic waves, which reduces the electromagnetic energy. Moreover, for most lenses, abrupt transitions of the refractive indices follow a simple line that is perpendicular to a lens surface. Consequently, electromagnetic waves propagating through the lenses suffer from considerable refraction, diffraction and reflection, which have a serious effect on the performances of the lenses.

SUMMARY OF THE INVENTION

In view of the aforesaid problems that the prior art suffers from considerable refraction, diffraction and reflection and have poor lens performances, an objective of the present invention is to provide a man-made composite material and a man-made composite material antenna that have superior performances.

To achieve the aforesaid objective, the present invention provides a man-made composite material. The man-made composite material is divided into a plurality of regions. An electromagnetic wave is incident on a first surface of the man-made composite material and exits from a second surface of the man-made composite material opposite to the first surface. An intersection between an $i^{th}$ region and the first surface is a bottom surface of the $i^{th}$ region. An intersection between the $i^{th}$ region and the second surface is a top surface of the $i^{th}$ region. A line connecting a radiation source to a point on the bottom surface of the $i^{th}$ region and a line perpendicular to the man-made composite material form an angle θ therebetween, which uniquely corresponds to a curved surface in the $i^{th}$ region. A set formed by points on the bottom surface of the region that have the same angle θ forms a boundary of the curved surface to which the angle θ uniquely corresponds. Each point on the curved surface to which the angle θ uniquely corresponds has a same refractive index. A generatrix of the curved surface is a parabolic arc. Refractive indices of each of the regions decrease gradually as the angle θ increases.

Preferably, a line connecting the radiation source to a point on an outer circumference of the bottom surface of the $i^{th}$ region and the line perpendicular to the man-made composite material form an angle $\theta_i$ therebetween, i is a positive integer, and the closer the region is to a center of the man-made composite material, the smaller the value of i will be; wherein a generatrix of a curved surface to which the angle $\theta_i$ corresponds has an arc length $c(\theta_i)$, and the arc length $c(\theta_i)$ and the angle $\theta_i$ satisfy the following equations:

$$c(\theta_i) = \frac{\lambda}{n_{max(i+1)} - n_{min(i)}};$$

$$s \times \left( \frac{1}{\cos\theta_i} - \frac{1}{\cos\theta_{i-1}} \right) = c(\theta_{i-1})n_{max(i)} - c(\theta_i)n_{min(i)},$$

where, $\theta_0 = 0$, $c(\theta_0) = d$; s is a distance from the radiation source to the man-made composite material; d is a thickness of the man-made composite material; λ is a wavelength of the electromagnetic waves, $n_{max(i)}$ and $n_{min(i)}$ are the maximum refractive index and the minimum refractive index of the $i^{th}$ region respectively, and $n_{max(i+1)}$ is the maximum refractive index of the $(i+1)^{th}$ region.

Preferably, the maximum refractive indices and the minimum refractive indices of any two adjacent ones of the regions satisfy: $n_{max(i)} - n_{min(i)} = n_{max(i+1)} - n_{min(i+1)}$.

Preferably, the maximum refractive indices and the minimum refractive indices of any three adjacent ones of the regions satisfy: $n_{max(i+1)} - n_{min(i)} > n_{max(i+2)} - n_{min(i+1)}$.

Preferably, a refractive index of the $i^{th}$ region satisfies:

$$n_i(\theta) = \frac{1}{c(\theta)}\left(n_{max(i)} \times d + s - \frac{s}{\cos\theta}\right),$$

where d is the thickness of the man-made composite material, θ is an angle formed between a line connecting the radiation source to a point on the bottom surface of the $i^{th}$ region and a line perpendicular to the man-made composite material, and c(θ) is an arc length of a generatrix of the curved surface to which the angle θ corresponds.

Preferably, when the generatrix of the curved surface is a parabolic arc, the arc length c(θ) satisfies the following equation:

$$c(\theta) = \frac{d}{2}\left[ \frac{\log(|\tan\theta| + \sqrt{1+\tan^2\theta}) + \delta}{|\tan\theta| + \delta} + \sqrt{1+\tan^2\theta}\right],$$

where δ is a preset decimal.

Preferably, when a line passing through a center of the first surface of the man-made composite material and perpendicular to the man-made composite material is taken as an abscissa axis and a line passing through the center of the first surface of the man-made composite material and parallel to the first surface is taken as an ordinate axis, an equation of a parabola where the parabolic arc is located is represented as:

$$y(x) = \tan\theta\left(-\frac{1}{2d}x^2 + x + s\right).$$

Preferably, when the generatrix of the curved surface is an elliptical arc, if the line passing through the center of the first surface of the man-made composite material and perpendicular to the man-made composite material is taken as an abscissa axis and the line passing through the center of the first surface of the man-made composite material and parallel to the first surface is taken as an ordinate axis, then an equation of an ellipse where the elliptical arc is located is represented as:

$$\frac{(x-d)^2}{a^2} + \frac{(y-c)^2}{b^2} = 1,$$

where a, b and c satisfy the following relationships:

$$\frac{d^2}{a^2} + \frac{(s\tan\theta - c)^2}{b^2} = 1; \text{ and}$$

$$\frac{\sin\theta}{\sqrt{n^2(\theta) - \sin^2(\theta)}} = \frac{b^2}{a^2} \frac{d}{s\tan\theta - c}.$$

Preferably, a refraction angle at a point on the first surface that corresponds to the angle $\theta$ is represented by $\theta'$, and the refractive index $n(\theta)$ at the point satisfies:

$$n(\theta) = \frac{\sin\theta}{\sin\theta'}.$$

Preferably, a line connecting the radiation source to a point on the outer circumference of the bottom surface of the $i^{th}$ region and the line perpendicular to the man-made composite material form an angle $\theta_i$ therebetween, i is a positive integer, and the closer the region is to a center of the man-made composite material, the smaller the value of i will be; wherein the angle $\theta_i$ satisfies the following equations:

$$\text{sinc}(\theta_i) = \frac{d}{\lambda}(n_{max(i+1)} - n_{min(i)});$$

$$s \times \left(\frac{1}{\cos\theta_i} - \frac{1}{\cos\theta_{i-1}}\right) = \frac{d}{\text{sinc}(\theta_{i-1})} n_{max(i)} - \frac{d}{\text{sinc}(\theta_i)} n_{min(i)},$$

where, $$\text{sinc}(\theta_i) = \frac{\sin(\theta_i)}{\theta_i}, \text{sinc}(\theta_{i-1}) = \frac{\sin(\theta_{i-1})}{\theta_{i-1}}, \theta_0 = 0;$$

s is a distance from the radiation source to the man-made composite material; d is the thickness of the man-made composite material; $\lambda$ is the wavelength of the electromagnetic waves, $n_{max(i)}$ and $n_{min(i)}$ are the maximum refractive index and the minimum refractive index of the $i^{th}$ region respectively, and $n_{max(i+1)}$ and $n_{min(i+1)}$ are the maximum refractive index and the minimum refractive index of the $(i+1)^{th}$ region respectively.

Preferably, the maximum refractive indices and the minimum refractive indices of any two adjacent ones of the regions satisfy: $n_{max(i)} - n_{min(i)} = n_{max(i+1)} - n_{min(i+1)}$.

Preferably, the maximum refractive indices and the minimum refractive indices of any three adjacent ones of the regions satisfy: $n_{max(i+1)} - n_{min(i)} > n_{max(i+2)} - n_{min(i+1)}$.

Preferably, a refractive index of the $i^{th}$ region satisfies:

$$n_i(\theta) = \frac{\sin\theta}{d \times \theta}\left(n_{max(i)} \times d + s - \frac{s}{\cos\theta}\right),$$

where $\theta$ is an angle formed between a line connecting the radiation source to a point on the bottom surface of the $i^{th}$ region and a line perpendicular to the man-made composite material.

Preferably, the man-made composite material is provided with an impedance matching layer at two sides thereof respectively.

The present invention further provides a man-made composite material antenna, which comprises a man-made composite material and a radiation source disposed at a focus of the man-made composite material. The man-made composite material is divided into a plurality of regions. An electromagnetic wave is incident on a first surface of the man-made composite material and exits from a second surface of the man-made composite material opposite to the first surface. An intersection between an $i^{th}$ region and the first surface is a bottom surface of the $i^{th}$ region. An intersection between the $i^{th}$ region and the second surface is a top surface of the $i^{th}$ region. A line connecting a radiation source to a point on the bottom surface of the $i^{th}$ region and a line perpendicular to the man-made composite material form an angle $\theta$ therebetween, which uniquely corresponds to a curved surface in the $i^{th}$ region. A set formed by points on the bottom surface of the $i^{th}$ region that have the same angle $\theta$ forms a boundary of the curved surface to which the angle $\theta$ uniquely corresponds. Each point on the curved surface to which the angle $\theta$ uniquely corresponds has a same refractive index. A generatrix of the curved surface is a parabolic arc. Refractive indices of each of the regions decrease gradually as the angle $\theta$ increases.

Preferably, a line connecting the radiation source to a point on an outer circumference of the bottom surface of the $i^{th}$ region and the line perpendicular to the man-made composite material form an angle $\theta_i$ therebetween, i is a positive integer, and the closer the region is to a center of the maxi made composite material, the smaller the value of i will be; wherein a generatrix of a curved surface to which the angle $\theta_i$ corresponds has an arc length $c(\theta_i)$, and the arc length $c(\theta_i)$ and the angle $\theta_i$ satisfy the following equations:

$$c(\theta_i) = \frac{\lambda}{n_{max(i+1)} - n_{min(i)}};$$

$$s \times \left(\frac{1}{\cos\theta_i} - \frac{1}{\cos\theta_{i-1}}\right) = c(\theta_{i-1})n_{max(i)} - c(\theta_i)n_{min(i)},$$

where, $\theta_0 = 0$, $c(\theta_0) = d$; s is a distance from the radiation source to the man-made composite material; d is a thickness of the man-made composite material; $\lambda$ is a wavelength of the electromagnetic waves, $n_{max(i)}$ and $n_{min(i)}$ are the maximum refractive index and the minimum refractive index of the $i^{th}$ region respectively, and $n_{max(i+1)}$ is the maximum refractive index of the $(i+1)^{th}$ region.

Preferably, the maximum refractive indices and the minimum refractive indices of any two adjacent ones of the regions satisfy: $n_{max(i)} - n_{min(i)} = n_{max(i+1)} - n_{min(i+1)}$.

Preferably, the maximum refractive indices and the minimum refractive indices of any three adjacent ones of the regions satisfy: $n_{max(i+1)} - n_{min(i)} > n_{max(i+2)} - n_{min(i+1)}$.

Preferably, a refractive index of the $i^{th}$ region satisfies:

$$n_i(\theta) = \frac{1}{c(\theta)}\left(n_{max(i)} \times d + s - \frac{s}{\cos\theta}\right),$$

where d is the thickness of the man-made composite material, $\theta$ is an angle formed between a line connecting the radiation source to a point on the bottom surface of the $i^{th}$ region and a line perpendicular to the man-made composite material, and $c(\theta)$ is an arc length of a generatrix of the curved surface to which the angle $\theta$ corresponds.

Preferably, the generatrix of the curved surface is a parabolic arc, an elliptical arc or a circular arc.

The technical solutions of the present invention have the following benefits: by designing abrupt transitions of the refractive indices of the man-made composite material to follow a curved surface, the refraction, diffraction and reflection at the abrupt transition points can be significantly reduced. As a result, the problems caused by interferences are eased, which further improves performances of the man-made composite material and the man-made composite material antenna.

BRIEF DESCRIPTION OF THE DRAWINGS

Hereinbelow, the present invention will be further described with reference to the attached drawings and embodiments thereof. In the attached drawings.

DETAILED DESCRIPTION OF THE INVENTION

Figure 2:
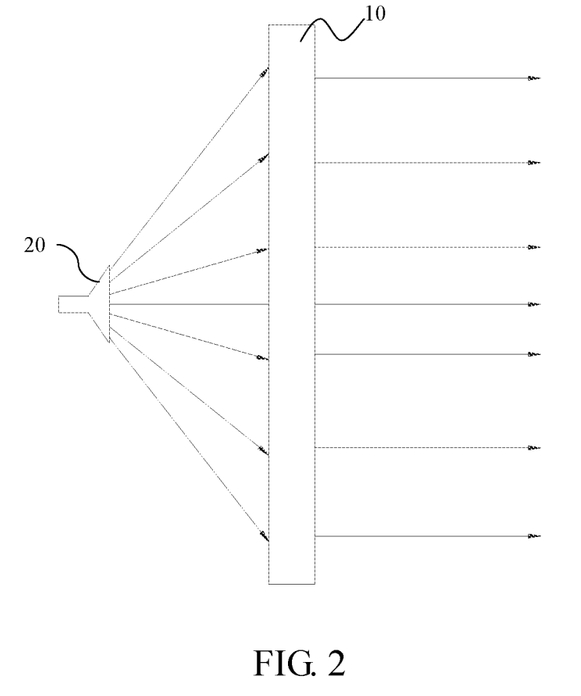
FIG. 2 is a schematic view illustrating a man-made composite material 10 according to an embodiment of the present invention which is converging the electromagnetic waves.

FIG. 2 is a schematic view illustrating a man-made composite material according to an embodiment of the present invention which is converging an electromagnetic wave. The man-made composite material 10 having the function of converging an electromagnetic wave is used to convert an electromagnetic wave emitted from a radiation source 20 into a plane wave.

As can be known as a common sense: the refractive index of the electromagnetic waves is proportional to $\sqrt{\epsilon\mu}$. When an electromagnetic wave propagates from a medium to another medium, the electromagnetic waves will be refracted; and if the refractive index distribution in the material is non-uniform, then the electromagnetic waves will be deflected towards a site having a large refractive index. By designing electromagnetic parameters of the man-made composite material at each point, the refractive index distribution of the man-made composite material can be adjusted so as to achieve the purpose of changing the propagating path of the electromagnetic waves. According to the aforesaid principle, the refractive index distribution of the man-made composite material 10 can be designed in such a way that an electromagnetic wave diverging in the form of a spherical wave that is emitted from the radiation source 20 is converted into a plane electromagnetic wave suitable for long-distance transmission.

Figure 3:
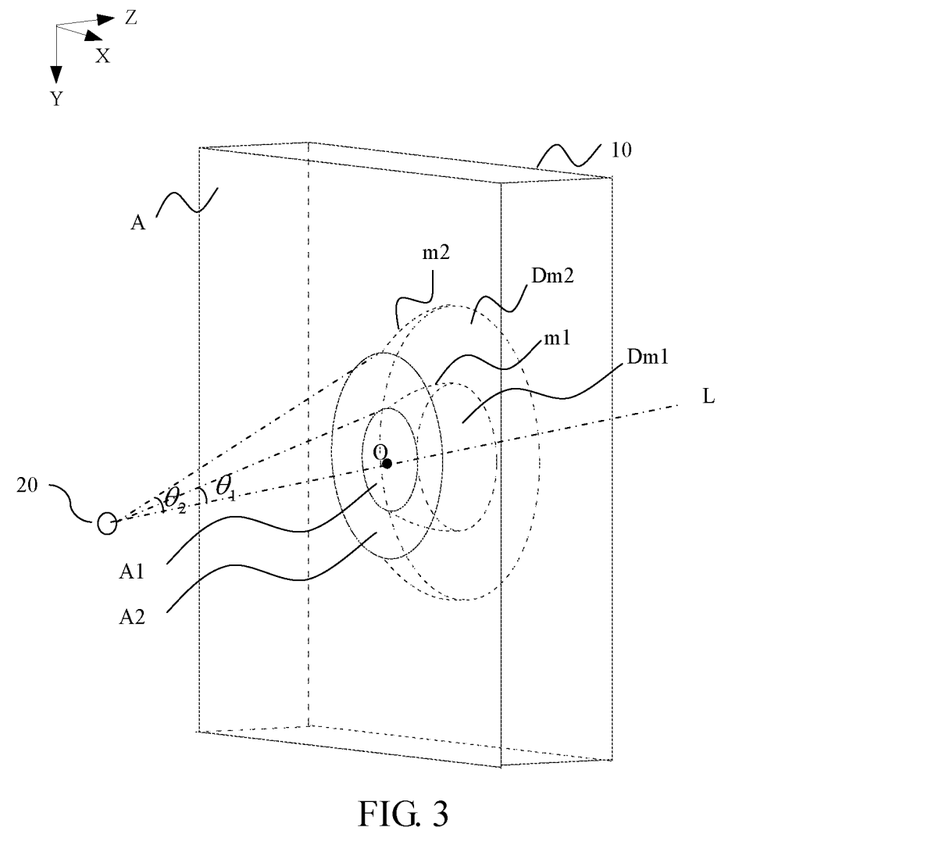
FIG. 3 is a schematic structural view of the man-made composite material 10 shown in FIG. 2.
Figure 4:
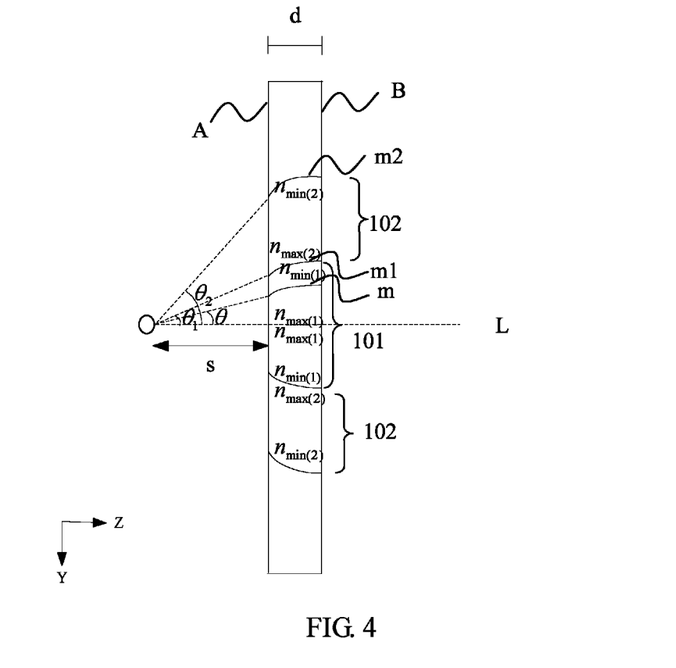
FIG. 4 is a side view of the man-made composite material 10 shown in FIG. 3.

FIG. 3 is a schematic structural view of the man-made composite material 10 shown in FIG. 2. The man-made composite material 10 is divided into a plurality of regions. An electromagnetic wave is incident on a first surface A of the man-made composite material 10 and exits from a second surface B (as shown in FIG. 4) of the man-made composite material 10 opposite to the first surface A.

An intersection between an $i^{th}$ region and the first surface A is a bottom surface of the $i^{th}$ region, and an intersection between the $i^{th}$ region and the second surface B is a top surface of the $i^{th}$ region. A line connecting the radiation source to a point on the bottom surface of the $i^{th}$ region and a line L passing through a center O of the man-made composite material and perpendicular to the man-made composite material form an angle $\theta$ therebetween, which uniquely corresponds to a curved surface in the $i^{th}$ region. A set formed by points on the bottom surface of the $i^{th}$ region that have the same angle $\theta$ forms a boundary of the curved surface to which the angle $\theta$ uniquely corresponds, and the boundary is a circumference obtained through rotation of a generatrix of the curved surface about the line L. Each point on the curved surface to which the angle $\theta$ uniquely corresponds has a same refractive index. Refractive indices of each of the regions decrease gradually as the angle $\theta$ increases. FIG. 3 shows two regions (the regions herein are three-dimensional, and are shown as two annular bodies in FIG. 3). The regions introduced herein are divided only for purpose of better describing the refractive index distribution of the man-made composite material, and are not actual entities. FIG. 4 is a side view of the man-made composite material 10. Two regions are shown in this side view only for purpose of illustration rather than to limit the present invention. The thickness of the man-made composite material 10 is as shown by d, and L represents a line perpendicular to the man-made composite material. As can be known from FIG. 4, each of the regions is a parabolic arc in a side view, and refractive indices on a same arc are identical to each other; that is, a curved surface formed by the arc when being rotated about the line L has the same refractive index at each point of the curved surface. The curved surface described herein is a virtual curved surface, and is introduced only for convenience of description.

Assume that a line connecting the radiation source 20 to a point on an outer circumference of the bottom surface of the $i^{th}$ region and the line L perpendicular to the man-made composite material 10 form an angle $\theta_i$ therebetween, i is a positive integer, and the closer the region is to the center O of the man-made composite material 10, the smaller the value of i will be. A generatrix of a curved surface to which the angle $\theta_i$ corresponds has an arc length $c(\theta_i)$, and the arc length $c(\theta_i)$ and the angle $\theta_i$ satisfy the following equations:

$$c(\theta_i) = \frac{\lambda}{n_{max(i+1)} - n_{min(i)}};$$

$$s \times \left(\frac{1}{\cos\theta_i} - \frac{1}{\cos\theta_{i-1}}\right) = c(\theta_{i-1})n_{max(i)} - c(\theta_i)n_{min(i)},$$

where, $\theta_0=0$, $c(\theta_0)=d$; s is a distance from the radiation source 20 to the man-made composite material 10; d is a thickness of the man-made composite material 10; $\lambda$ is a wavelength of the electromagnetic waves, $n_{max(i)}$ and $n_{min(i)}$ are the maximum refractive index and the minimum refractive index of the $i^{th}$ region respectively, and $n_{max(i+1)}$ and $n_{min(i+1)}$ are the maximum refractive index and the minimum refractive index of the $(i+1)^{th}$ region respectively. The angle $\theta$ or $\theta_i$ ranges between $$[0, \frac{\pi}{2}).$$

The maximum refractive indices and the minimum refractive indices of any two adjacent ones of the regions satisfy: $n_{max(i)} - n_{min(i)} = n_{max(i+1)} - n_{min(i+1)}$.

As shown in FIG. 3 and FIG. 4, the two regions 101 and 102 are shown therein. $\theta_i$ represents an angle formed between a line connecting the radiation source 20 to a point on an outer circumference of the bottom surface of the first region 101 and the line L perpendicular to the man-made composite material 10, and $\theta_2$ represents an angle formed between a line connecting the radiation source 20 to a point on an outer circumference of the bottom surface of the second region 102 and the line L perpendicular to the man-made composite material 10. Supposing that $n_{max(1)}$ and $n_{min(1)}$ are already known, the angle $\theta_1$ of the first region and the maximum refractive index $n_{max(2)}$ can be obtained through the following equations:

$$c(\theta_1) = \frac{\lambda}{n_{max(2)} - n_{min(1)}};$$

$$s \times \left(\frac{1}{\cos\theta_1} - 1\right) = c(\theta_0)n_{max(1)} - c(\theta_1)n_{min(1)}.$$

The angle $\theta$ of the second region and the maximum refractive index $n_{max(3)}$ can be obtained through the following equations:

$$c(\theta_2) = \frac{\lambda}{n_{max(3)} - n_{min(2)}};$$

$$s \times \left(\frac{1}{\cos\theta_2} - \frac{1}{\cos\theta_1}\right) = c(\theta_1)n_{max(2)} - c(\theta_2)n_{min(2)}.$$

In an embodiment of the present invention, the maximum refractive indices and the minimum refractive indices of any three adjacent ones of the regions satisfy:

$n_{max(i+1)} - n_{min(i)} > n_{max(i+2)} - n_{min(i+1)}$.

As shown in FIG. 4, a generatrix of a curved surface of the outermost boundary of each of the regions is an arc. The arc shown in the side view is just the generatrix of the curved surface of the outermost boundary of each of the regions. In order to describe more clearly that points on the same curved surface have the same refractive index, curved surfaces inside each of the regions are also elucidated. For each of the regions, a curved surface of an inner boundary has the maximum refractive index and a curved surface of an outer boundary has the minimum refractive index.

As shown in FIG. 3 and FIG. 4, a line connecting the radiation source to a point on the outer circumference of the bottom surface A1 of the first region 101 and the line L form an angle $\theta_1$ therebetween, a curved surface Dm1 of the outermost boundary of the first region 101 has a generatrix m1, the arc has an arc length $c(\theta_1)$, and the curved surface formed by the arc m1 when being rotated about the line L is Dm1. A line connecting the radiation source to a point on the outer circumference of the bottom surface A2 of the second region 102 and the line L form an angle $\theta$, therebetween, a curved surface Dm2 of the outermost boundary of the second region 102 has a generatrix m2, the arc m2 has an arc length $c(\theta_2)$, and the curved surface formed by the arc m2 when being rotated about the line L is Dm2. As shown in FIG. 4, the arcs m1 and m2 are distributed symmetrically with respect to the line L. Refractive index distributions on the curved surfaces Dm1 and Dm2 are identical to each other.

For any of the regions, supposing that a line connecting the radiation source to a point on the bottom surface of the $i^{th}$ region and the line L perpendicular to the man-made composite material form an angle $\theta$ therebetween, then the rule oldie refractive index $n_i(\theta)$ of the $i^{th}$ region varying with the angle $\theta$ satisfies:

$$n_i(\theta) = \frac{1}{c(\theta)}\left(n_{max(i)} \times d + s - \frac{s}{\cos\theta}\right),$$

where d is the thickness of the man-made composite material 10, $\theta$ is the angle formed between the line connecting the radiation source 20 to a point on the bottom surface of the $i^{th}$ region and the line L perpendicular to the man-made composite material, $c(\theta)$ is an arc length of a generatrix of the curved surface to which the angle $\theta$ corresponds, the angle $\theta$ uniquely corresponds to a curved surface in the $i^{th}$ region, and each point on the curved surface to which the angle $\theta$ uniquely corresponds has a same refractive index. In FIG. 4, as an example, the angle $\theta$ uniquely corresponds to a curved surface in the first region 101, and the curved surface has a generatrix m.

Figure 5:
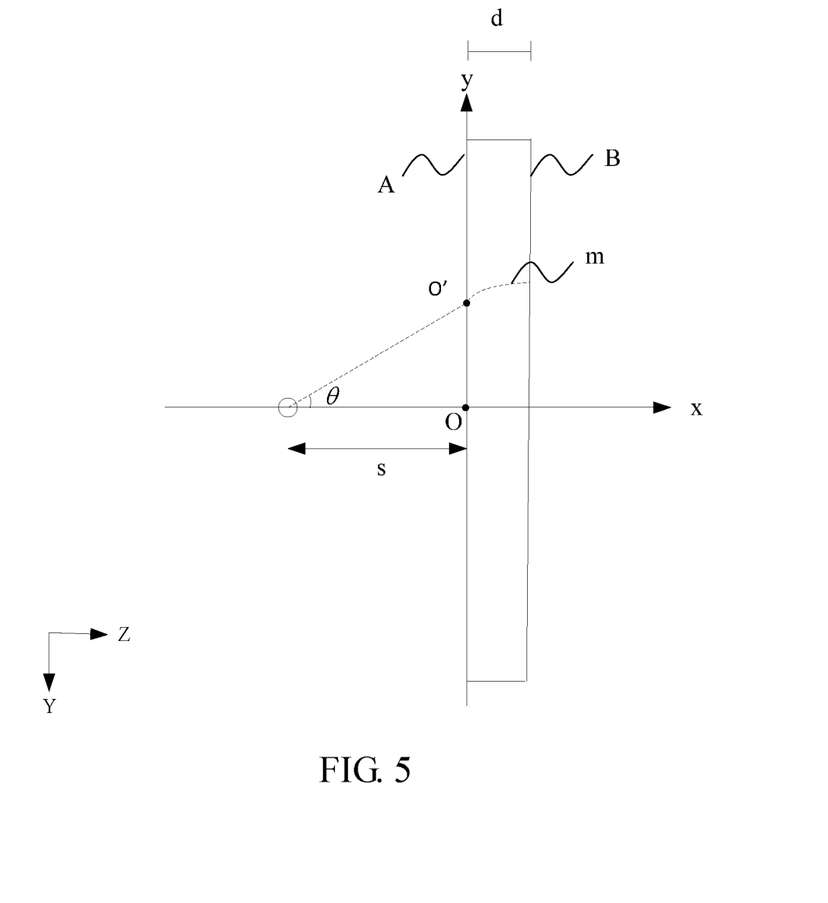
FIG. 5 is a schematic view illustrating relationships between an arc m shown in FIG. 4 and an angle $\theta$ when the arc m is a parabolic arc.

FIG. 5 is a schematic view illustrating relationships between the arc in and the angle $\theta$ shown in FIG. 4 when the arc in is a parabolic arc. Suppose that an equation of a parabola where the parabolic arc m is located is: $y(x) = ax^2 + bx + c$. The parabola passes through a point $(0, s \tan \theta)$; i.e., $y(0) = c = s \tan \theta$. In order to make the electromagnetic waves propagate outwards in parallel after passing through the man-made composite material 10, a tangent line of the parabolic arc m must be parallel with the X axis when the electromagnetic waves propagates through the second surface B of the man-made composite material 10; i.e., it must be ensured that $y'(d) = 0$. Because $y'(x) = 2ax + b$, $y'(d) = 2d + b = 0$. In addition, it must also be ensured that the electromagnetic waves propagates in a tangent direction corresponding to the angle $\theta$ when reaching the first surface A of the man-made composite material 10, so $y'(0) = \tan \theta$. It can be derived from the aforesaid conditions that the equation of the parabola is $$y(x) = \tan\theta\left(-\frac{1}{2d}x^2 + x + s\right).$$

Thereby, a relational expression between the angle $\theta$ and each point $(x, y)$ on the parabolic arc m is obtained as $$\theta(x, y) = \tan^{-1}\left[\frac{2dy}{2d(s+x) - x^2}\right].$$

The angle $\theta$ uniquely corresponds to a curved surface in the man-made composite material, which is obtained through rotation of the generatrix m about the line L (the X axis); and each point on the curved surface to which the angle $\theta$ uniquely corresponds has a same refractive index. The arc length $c(\theta)$ of the arc m satisfies the following equation:

$$c(\theta) = \frac{d}{2}\left[\frac{\log(|\tan\theta| + \sqrt{1+\tan^2\theta}) + \delta}{|\tan\theta| + \delta} + \sqrt{1+\tan^2\theta}\right],$$

where $\delta$ is a preset decimal. $\delta$ is a preset decimal (e.g., 0.0001), and can ensure that the ratio $$\frac{\log(|\tan\theta| + \sqrt{1+\tan^2\theta}) + \delta}{|\tan\theta| + \delta}$$

converges when the angle $\theta$ approaches to 0. The angle $\theta$ ranges between $$\left[0, \frac{\pi}{2}\right).$$

As shown in FIG. 5, when the line L passing through the center O of the first surface A of the man-made composite material 10 and perpendicular to the man-made composite material 10 is taken as an abscissa axis and a line passing through the center O of the first surface A of the man-made composite material 10 and parallel to the first surface A is taken as an ordinate axis, a line connecting the radiation source to a certain point O' on the surface A and the X axis form an angle $\theta$ therebetween, and a generatrix of a virtual curved surface to which the angle $\theta$ corresponds is the parabolic arc m shown by a dashed line. Then, the angle $\theta$ and each point (x, y) on the parabolic arc m satisfy the following relational expression:

$$\theta(x, y) = \tan^{-1}\left[\frac{2dy}{2d(s+x) - x^2}\right].$$

Figure 6:
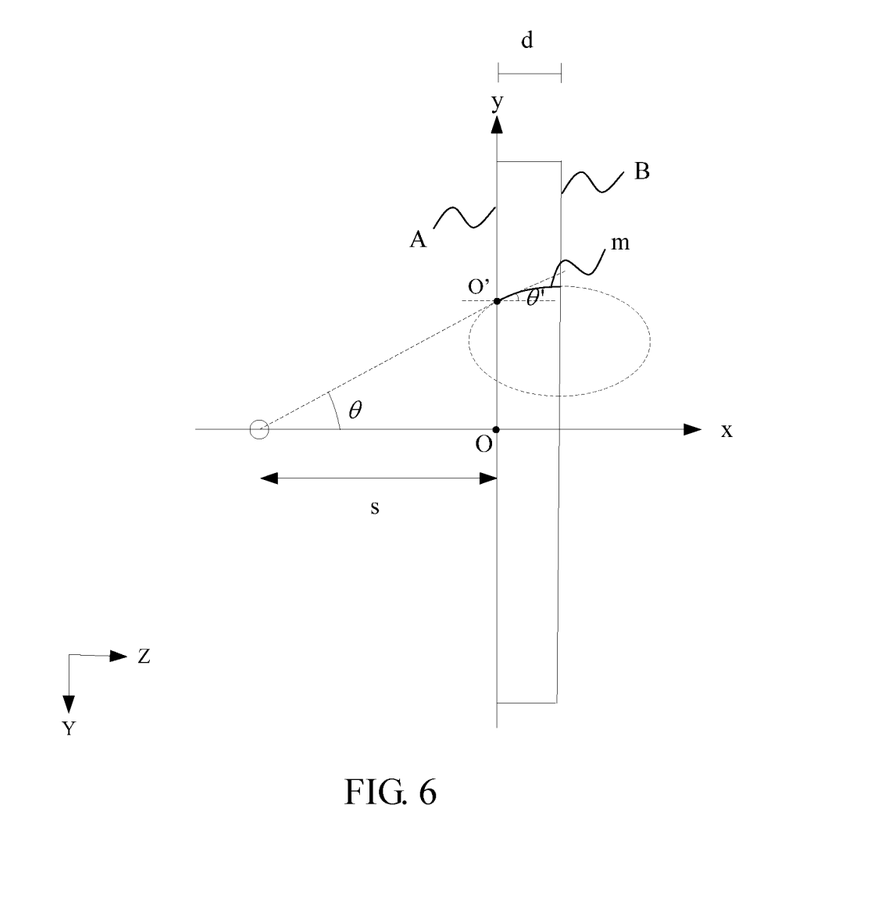
FIG. 6 is a schematic view illustrating relationships between the arc m shown in FIG. 4 and the angle $\theta$ when the arc m is an elliptical arc.

FIG. 6 is a schematic view illustrating relationships between the arc m and the angle $\theta$ shown in FIG. 4 when the arc m is an elliptical arc. When the line L passing through the center O of the first surface A of the man-made composite material 10 and perpendicular to the man-made composite material 10 is taken as an abscissa axis and the line passing through the center O of the first surface A of the man-made composite material 10 and parallel to the first surface A is taken as an ordinate axis, a line connecting the radiation source to a certain point O' on the surface A and the X axis form an angle $\theta$ therebetween, and a generatrix of a virtual curved surface to which the angle corresponds is the elliptical arc m shown by a solid line.

An equation of an ellipse where the elliptical arc m shown by the solid line on the ellipse is located is:

$$\frac{(x-d)^2}{a^2} + \frac{(y-c)^2}{b^2} = 1.$$

A center of the ellipse is located on the second surface B, and has coordinates or (d, c). The ellipse passes through a point (0, s tan $\theta$); i.e. y(0)=s tan $\theta$. Through the equation of the ellipse, it can be obtained that $$\frac{d^2}{a^2} + \frac{(d\tan\theta - c)^2}{b^2} = 1.$$

In order to make the electromagnetic waves propagate outwards in parallel after passing through the man-made composite material, a tangent line of the elliptical arc must be parallel with the X axis when the electromagnetic waves propagates through the second surface B of the man-made composite material; i.e., it must be ensured that y'(d)=0. A tangential equation at any point (x, y) on the ellipse is $$\frac{dy}{dx} = -\frac{b^2}{a^2}\frac{x-d}{y-c},$$

so it can be obtained that y'(d)=0.

The point O' on the first surface A to which the angle $\theta$ corresponds has a refraction angle $\theta'$ and a refractive index $n(\theta)$; and it can be known from the Snell's law that $$n(\theta) = \frac{\sin\theta}{\sin\theta'}.$$

The electromagnetic waves propagates in a tangent direction corresponding to the refraction angle $\theta'$ when reaching the first surface A of the man-made composite material 10 (as shown in FIG. 5). That is, at a point where the elliptical arc m infinitely approaches to the point O', y'(0$^+$)=tan $\theta'$. Thereby, the following relational expression can be obtained:

$$y'(\theta^+) = \tan\theta' = \frac{\sin\theta}{\sqrt{n^2(\theta) - \sin^2(\theta)}} = \frac{b^2}{a^2}\frac{d}{s\tan\theta - c}.$$

The angle $\theta$ uniquely corresponds to a curved surface in the man-made composite material, which is obtained through rotation of the generatrix m about the line L (the X axis); and each point on the curved surface to which the angle $\theta$ uniquely corresponds has a same refractive index.

Figure 7:
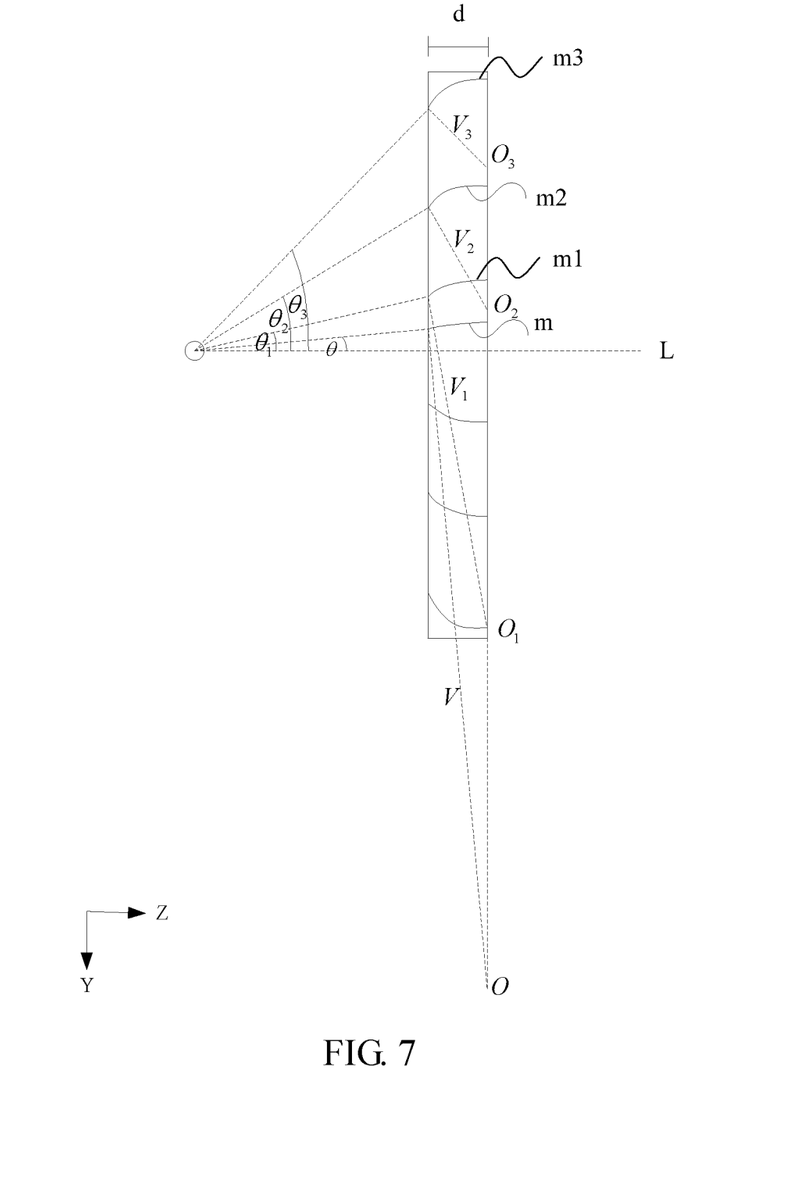
FIG. 7 is a schematic view illustrating the construction of the arc m shown in FIG. 4 when the arc m is a circular arc.

FIG. 7 is a schematic view illustrating the construction of the arc m shown in FIG. 4 when the arc m is a circular arc. Generatrices of side surfaces (including an outer surface and an inner surface) of each of the regions are circular arc segments. A generatrix of an outer surface of the i$^{th}$ region is a circular arc segment, and the circular arc segments shown in the side view are just the generatrices of outer surfaces of the regions. In order to describe more clearly that points on the same curved surface has the same refractive index, curved surfaces inside each of the regions are also elucidated. An intersection point between a perpendicular line, which is perpendicular to a line connecting the radiation source to a point on an outer circumference of the bottom surface of the i$^{th}$ region, and a surface of the man-made composite material that faces away from the radiation source is a circle center of the circular arc segment, and a perpendicular line segment between the intersection point and a point on the outer circumference of the bottom surface of the i$^{th}$ region is a radius of the circular arc segment.

A generatrix of an inner surface of the i$^{th}$ region is a circular arc segment. An intersection point between a perpendicular line, which is perpendicular to a line connecting the radiation source to a point on an inner circumference of the bottom surface of the i$^{th}$ region, and a surface of the man-made composite material that faces away from the radiation source is a circle center of the circular arc segment, and a perpendicular line segment between the intersection point and a point on the outer circumference of the bottom surface of the $i^{th}$ region is a radius of the circular arc segment, where i≥2. The first region is solid and has no inner surface. The $(i+1)^{th}$ region has an inner surface that is closely attached on the outer surface of the $i^{th}$ region; that is, the inner surface of the $(i+1)^{th}$ region has the same curvature as the outer surface of the $i^{th}$ region at each point. For each of the regions, the inner surface has the maximum refractive index and the outer surface has the minimum refractive index.

A line connecting the radiation source to a point on the outer circumference of the bottom surface of the first region and the line L form an angle $\theta_1$ therebetween, an intersection point between a perpendicular line segment $V_1$, which is perpendicular to the line connecting the radiation source to a point on the outer circumference of the bottom surface of the first region, and the other surface of the man-made composite material is $O_1$, and the outer surface of the first region (i.e., the curved surface Dm1 of the outermost boundary in FIG. 3) has a generatrix m1, which is a circular arc segment obtained through rotation with the intersection point $O_1$ as a circle center and the perpendicular line segment $V_1$ as a radius. Likewise, a line connecting the radiation source to a point on the outer circumference of the bottom surface of the second region and the line L form an angle $\theta_2$ therebetween, an intersection point between a perpendicular line segment $V_2$, which is perpendicular to the line connecting the radiation source to a point on the outer circumference of the bottom surface of the second region, and the other surface of the man-made composite material is $O_2$, and the outer surface of the second region (i.e., the curved surface Dm2 of the outermost boundary in FIG. 3) has a generatrix m2, which is a circular arc segment obtained through rotation with the intersection point $O_2$ as a circle center and the perpendicular line segment. $V_2$ as a radius. A line connecting the radiation source to a point on the outer circumference of the bottom surface of the third region and the line L form an angle $\theta_3$ therebetween, an intersection point between a perpendicular line segment $V_3$, which is perpendicular to the line connecting the radiation source to a point on the outer circumference of the bottom surface of the third region, and the other surface of the man-made composite material is $O_3$, and the outer surface of the third region has a generatrix m3, which is a circular arc segment obtained through rotation with the intersection point $O_3$ as a circle center and the vertical line segment 63 as a radius. As shown in FIG. 7, the circular arc segments m1, m2, m3 are distributed symmetrically with respect to the line L.

When the arc shown in FIG. 4 is a circular arc, a line connecting the radiation source to a point on the outer circumference of the bottom surface of the $i^{th}$ region and the line perpendicular to the man-made composite material form an angle $\theta_i$ therebetween, i is a positive integer, and the closer the region is to the center of the man-made composite material, the smaller the value of i will be. The angle $\theta_i$ satisfies the following equations:

$$\sin c(\theta_i) = \frac{d}{\lambda}(n_{max(i+1)} - n_{min(i)});$$

$$s \times \left(\frac{1}{\cos\theta_i} - \frac{1}{\cos\theta_{i-1}}\right) = \frac{d}{\sin c(\theta_{i-1})}n_{max(i)} - \frac{d}{\sin c(\theta_i)}n_{min(i)},$$

where, $$\sin c(\theta_i) = \frac{\sin(\theta_i)}{\theta_i}, \sin c(\theta_{i-1}) = \frac{\sin(\theta_{i-1})}{\theta_{i-1}}, \theta_0 = 0;$$

s is a distance from the radiation source to the man-made composite material; d is the thickness of the man-made composite material; λ is the wavelength of the electromagnetic waves, $n_{max(i)}$ and $n_{min(i)}$ are the maximum refractive index and the minimum refractive index of the $i^{th}$ region respectively, and $n_{max(i+1)}$ and $n_{min(i+1)}$ are the maximum refractive index and the minimum refractive index of the $(i+1)^{th}$ region respectively. The maximum refractive indices and the minimum refractive indices of any two adjacent ones of the regions satisfy: $n_{max(i)} - n_{min(i)} = n_{max(i+1)} - n_{min(i+1)}$. The angle θ or $\theta_i$ ranges between $$\left[0, \frac{\pi}{2}\right).$$

Supposing that $n_{max(1)}$ and $n_{min(1)}$ are already known, the angle $\theta_1$ and the maximum refractive index $n_{max(2)}$ of the first region can be obtained through the following equations:

$$\sin c(\theta_1) = \frac{d}{\lambda}(n_{max(2)} - n_{min(1)});$$

$$s \times \left(\frac{1}{\cos\theta_1} - 1\right) = \frac{d}{\sin c(\theta_0)}n_{max(1)} - \frac{d}{\sin c(\theta_1)}n_{min(1)}.$$

The angle $\theta_2$ and the maximum refractive index $n_{max(3)}$ of the second region can be obtained through the following equations:

$$\sin c(\theta_2) = \frac{d}{\lambda}(n_{max(3)} - n_{min(2)});$$

$$s \times \left(\frac{1}{\cos\theta_2} - \frac{1}{\cos\theta_1}\right) = \frac{d}{\sin c(\theta_1)}n_{max(2)} - \frac{d}{\sin c(\theta_2)}n_{min(2)}.$$

The angle $\theta_3$ of the third region can be obtained through the following equations:

$$\sin c(\theta_3) = \frac{d}{\lambda}(n_{max(4)} - n_{min(3)});$$

$$s \times \left(\frac{1}{\cos\theta_3} - \frac{1}{\cos\theta_2}\right) = \frac{d}{\sin c(\theta_2)}n_{max(3)} - \frac{d}{\sin c(\theta_3)}n_{min(3)}.$$

In an embodiment of the present invention, the maximum refractive indices and the minimum refractive indices of any three adjacent ones of the regions satisfy:

$$n_{max(i+1)} - n_{min(i)} > n_{max(i+2)} - n_{min(i+1)}.$$

The refractive index $n_i(\theta)$ of the $i^{th}$ region satisfies:

$$n_i(\theta) = \frac{\sin\theta}{d \times \theta}\left(n_{max(i)} \times d + s - \frac{s}{\cos\theta}\right),$$

where θ is an angle formed between a line connecting the radiation source to a point on the bottom surface of the $i^{th}$ region and a line perpendicular to the man-made composite material.

The man-made composite material 10 can be used to convert the electromagnetic waves emitted from the radiation source into a plane wave. Refractive indices of each of the regions of the man-made composite material 10 decrease from $n_{max(i)}$ to $n_{min(i)}$ as the angle increases, as shown in FIG. 4. It shall be appreciated that, the man-made composite material 10 of the present invention may also be used to converge a plane wave to a focus (i.e., a case reversed from what is shown in FIG. 2). In this case, there is no need to change the construction of the man-made composite material 10 so long as the radiation source is placed at the side of the second surface B; and the principle is the same except that the radiation source in the definition of the angle θ shall be located at the side of the first surface A and located at a position of the virtual radiation source corresponding to the focus of the man-made composite material. Various applications adopting the principle of the present invention shall all fall within the scope of the present invention.

In practical structure designs, the man-made composite material may be designed to be formed by a plurality of man-made composite material sheet layers, each of which comprises a sheet substrate and a plurality of man-made microstructures or man-made pore structures attached on the substrate. The overall refractive index distribution of the plurality of man-made composite material sheet layers combined together must satisfy or approximately satisfy the aforesaid equations so that refractive indices on a same curved surface are identical to each other, and the generatrix of the curved surface is designed as an elliptical arc, a parabolic arc or a circular arc. Of course, in practical designs, it may be relatively difficult to design the generatrix of the curved surface as an accurate elliptical arc or an accurate parabolic arc, so the generatrix of the curved surface may be designed as an approximate elliptical arc, an approximate parabolic arc, an approximate circular arc or a stepped form as needed and degrees of accuracy may be chosen as needed. With continuous advancement of the technologies, the designing manners are also updated continuously, and there may be a better designing process for the man-made composite material to achieve the refractive index distribution provided by the present invention.

Each of the man-made microstructures is a two-dimensional (2D) or three-dimensional (3D) structure consisting of at least one metal wire and having a geometric pattern, and may be of, for example but is not limited to, an "l" form, a "+" form or an elliptical form. The metal wire may be a copper wire or a silver wire, and may be attached on the substrate through etching, electroplating, drilling, photolithography, electron etching or ion etching. The plurality of man-made microstructures in the man-made composite material make refractive indices of the man-made composite material decrease as the angle θ increases. Given that an incident electromagnetic wave is known, by appropriately designing topology patterns of the man-made microstructures and designing arrangement of the man-made microstructures of different dimensions within an electromagnetic wave converging component, the refractive index distribution of the man-made composite material can be adjusted to convert an electromagnetic wave diverging in the form of a spherical wave into a plane electromagnetic waves.

Figure 8:
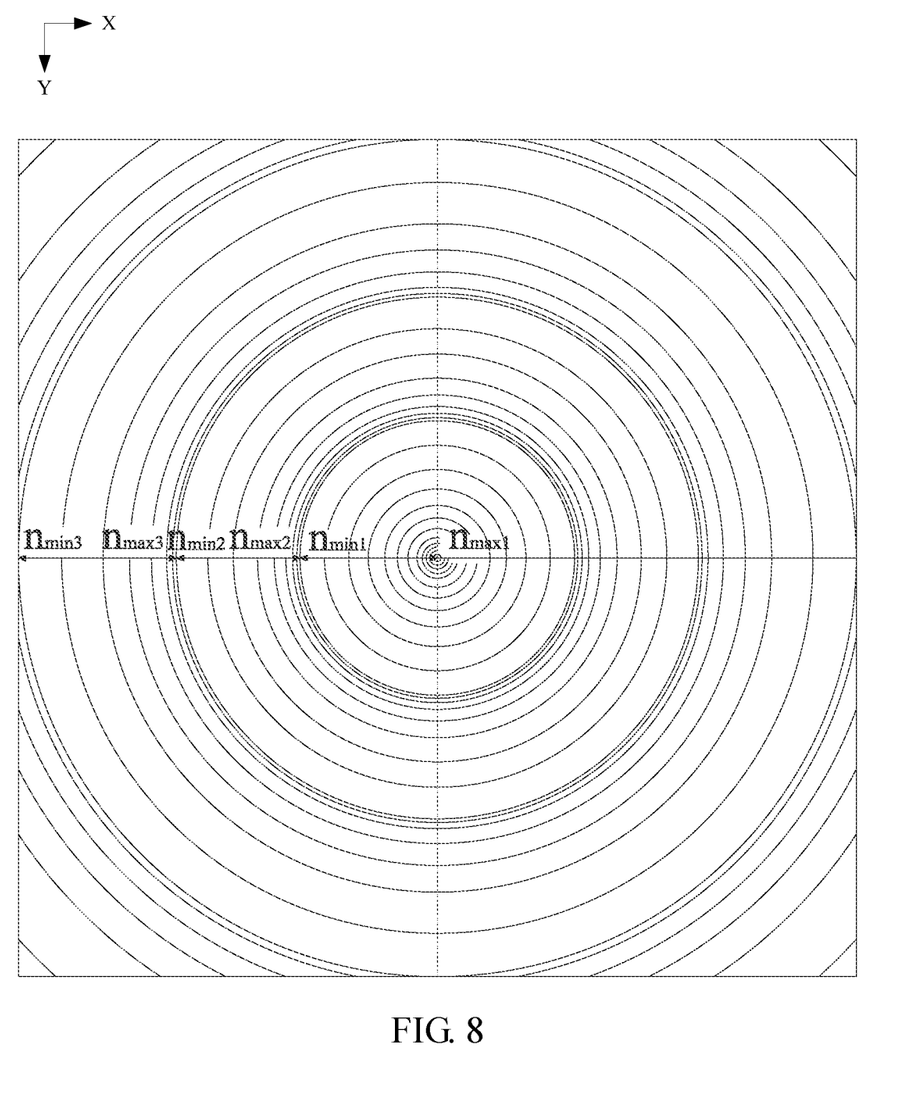
FIG. 8 is a diagram illustrating a refractive index distribution of the man-made composite material 10 in a YX plane.

In order to represent more intuitively the refractive index distribution of each of the man-made composite material sheet layers in a YX plane, the units that have the same refractive index are connected to form a line, and the magnitude of the refractive index is represented by the density of the lines. A higher density of the lines represents a larger refractive index. The refractive index distribution of the man-made composite material satisfying all of the above relational expressions is as shown in FIG. 8.

The present invention has been elucidated in detail by taking the parabolic arc and the elliptical arc as examples. As a non-limiting example, the present invention may further be applied to other kinds of curves such as irregular curves. The cases satisfying the refractive index distribution principle of the present invention shall all fall within the scope of the present invention.

The present invention further provides a man-made composite material antenna. As shown in FIG. 2 and FIG. 3, the man-made composite material antenna comprises the man-made composite material 10 and a radiation source 20 disposed at a focus of the man-made composite material 10. The structure and the refractive index variations of the man-made composite material 10 have been described above, and thus will not be further described herein.

The aforesaid man-made composite material may be in the form shown in FIG. 3, and of course, may also be made into other desired forms such as an annular form so long as the aforesaid refractive index variation rules can be satisfied. The man-made composite material of the present invention can be used as a lens and can also be used in antennae in the field of communication, and thus has a wide application scope.

In practical applications, in order to achieve better performances of the man-made composite material and reduce the reflection, an impedance matching layer may be disposed at each of two sides of the man-made composite material. Details of the impedance matching layer can be found in the prior art documents, and thus will not be further described herein.

By designing abrupt transitions of the refractive indices of the man-made composite material to follow a curved surface according to the present invention, the refraction, diffraction and reflection at the abrupt transition points can be significantly reduced. As a result, the problems caused by interferences are eased, which further improves performances of the man-made composite material.

The embodiments of the present invention have been described above with reference to the attached drawings; however, the present invention is not limited to the aforesaid embodiments, and these embodiments are only illustrative but are not intended to limit the present invention. Those of ordinary skill in the art may further devise many other implementations according to the teachings of the present invention without departing from the spirits and the scope claimed in the claims of the present invention, and all of the implementations shall fall within the scope of the present invention.

What is claimed is:

1. A man-made composite material, wherein the man-made composite material has a thickness and is divided into a plurality of regions; an electromagnetic wave is incident on a first surface of the man-made composite material and exits from a second surface of the man-made composite material opposite to the first surface; an $i^{th}$ region is one of the plurality of regions, and i is a positive integer and selected from a group consisted of 1, 2, 3, . . . , etc.;

an intersection between the $i^{th}$ region and the first surface is a bottom surface of the $i^{th}$ region, an intersection between the $i^{th}$ region and the second surface is a top surface of the $i^{th}$ region; a line connecting a radiation source to a point on the bottom surface of the $i^{th}$ region and a line perpendicular to the man-made composite material form an angle θ therebetween, which uniquely corresponds to a curved surface in the $i^{th}$ region, the curved surface to which the angle θ uniquely corresponds is sandwiched between the bottom surface and the top surface of the $i^{th}$ region, a set of points on the bottom surface of the $i^{th}$ region that have the same angle θ forms a boundary of the curved surface to which the angle θ uniquely corresponds;

each point on the curved surface to which the angle θ uniquely corresponds has a same refractive index; the curved surface to which the angle θ uniquely corresponds has a generatrix which extends along a direction of the thickness of the man-made composite material and between the bottom surface and the top surface of the $i^{th}$ region, the curved surface to which the angle θ uniquely corresponds is formed by rotating the generatrix about the line perpendicular to the man-made composite material; and refractive indices of each of the regions decrease gradually as the angle θ increases.

2. The man-made composite material of claim 1, wherein a line connecting the radiation source to a point on an outer circumference of the bottom surface of the $i^{th}$ region and the line perpendicular to the man-made composite material form an angle θi therebetween, and the closer the region is to a center of the man-made composite material, the smaller the value of i will be; wherein a generatrix of a curved surface to which the angle θi corresponds has an arc length $c(\theta_i)$, and the arc length $c(\theta_i)$ and the angle θi satisfy the following equations:

$$c(\theta_i) = \frac{\lambda}{n_{max(i+1)} - n_{min(i)}};$$

$$s \times \left(\frac{1}{\cos\theta_i} - \frac{1}{\cos\theta_{i-1}}\right) = c(\theta_{i-1})n_{max(i)} - c(\theta_i)n_{min(i)},$$

where, $\theta_0 = 0$, $c(\theta_0) = d$ ; s is a distance from the radiation source to the man-made composite material; d is the thickness of the man-made composite material; λ is a wavelength of the electromagnetic waves, $n_{max(i)}$ and $n_{min(i)}$ are the maximum refractive index and the minimum refractive index of the $i^{th}$ region respectively, and $n_{max(i+1)}$ is the maximum refractive index of the (i+1)th region.

3. The man-made composite material of claim 2, wherein the maximum refractive indices and the minimum refractive indices of any two adjacent ones of the regions satisfy: $n_{max(i)} - n_{min(i)} = n_{max(i+1)} - n_{max(i+1)} - n_{min(i+1)}$.

4. The man-made composite material of claim 3, wherein the maximum refractive indices and the minimum refractive indices of any three adjacent ones of the regions satisfy: $n_{max(i+1)} - n_{min(i)} = n_{max(i+2)} - n_{min(i+1)}$.

5. The man-made composite material of claim 2, wherein a refractive index of the $i^{th}$ region satisfies:

$$n_i(\theta) = \frac{1}{c(\theta)}\left(n_{max(i)} \times d + s - \frac{s}{\cos\theta}\right),$$

where d is the thickness of the man-made composite material, θ is an angle formed between a line connecting the radiation source to a point on the bottom surface of the $i^{th}$ region and a line perpendicular to the man-made composite material, and c(θ) is an arc length of a generatrix of the curved surface to which the angle θ corresponds.

6. The man-made composite material of claim 5, wherein when the generatrix of the curved surface is a parabolic arc, the arc length c(θ) satisfies the following equation:

$$c(\theta) = \frac{d}{2}\left[\frac{\log(|\tan\theta| + \sqrt{1 + \tan^2\theta}) + \delta}{|\tan\theta| + \delta} + \sqrt{1 + \tan^2\theta}\right],$$

where δ is a preset decimal.

7. The man-made composite material of claim 6, wherein when a line passing through a center of the first surface of the man-made composite material and perpendicular to the man-made composite material is taken as an abscissa axis and a line passing through the center of the first surface of the man-made composite material and parallel to the first surface is taken as an ordinate axis, an equation of a parabola where the parabolic arc is located is represented as:

$$y(x) = \tan\theta\left(-\frac{1}{2d}x^2 + x + s\right).$$

8. The man-made composite material of claim 5, wherein when the generatrix of the curved surface is an elliptical arc, if the line passing through the center of the first surface of the man-made composite material and perpendicular to the man-made composite material is taken as an abscissa axis and the line passing through the center of the first surface of the man-made composite material and parallel to the first surface is taken as an ordinate axis, then an equation of an ellipse where the elliptical arc is located is represented as:

$$\frac{(x-d)^2}{a^2} + \frac{(y-c)^2}{b^2} = 1,$$

where a, b and c satisfy the following relationships:

$$\frac{d^2}{a^2} + \frac{(s\tan\theta - c)^2}{b^2} = 1;$$

and $$\frac{\sin\theta}{\sqrt{n^2(\theta) - \sin^2(\theta)}} = \frac{b^2}{a^2}\frac{d}{s\tan\theta - c}.$$

9. The man-made composite material of claim 8, wherein a refraction angle at a point on the first surface that corresponds to the angle θ is represented by θ', and the refractive index n(θ) at the point satisfies:

$$n(\theta) = \frac{\sin\theta}{\sin\theta'}.$$

10. The man-made composite material of claim 1, wherein a line connecting the radiation source to a point on the outer circumference of the bottom surface of the $i^{th}$ region and the line perpendicular to the man-made composite material form an angle θi therebetween, i is a positive integer, and the closer the region is to a center of the man-made composite material, the smaller the value of i will be; wherein the angle θi satisfies the following equations:

$$\sin c(\theta_i) = \frac{d}{\lambda}(n_{max(i+1)} - n_{min(i)});$$

$$s \times \left(\frac{1}{\cos\theta_i} - \frac{1}{\cos\theta_{i-1}}\right) = \frac{d}{\sin c(\theta_{i-1})}n_{max(i)} - \frac{d}{\sin c(\theta_i)}n_{min(i)},$$

where, $$\sin c(\theta_i) = \frac{\sin(\theta_i)}{\theta_i},$$

$$\sin c(\theta_{i-1}) = \frac{\sin(\theta_{i-1})}{\theta_{i-1}},$$

$$\theta_0 = 0;$$

S is a distance from the radiation source to the man-made composite material; d is the thickness of the man-made composite material; λ is the wavelength of the electromagnetic waves, $n_{max(i)}$ and $n_{min(i)}$ are the maximum refractive index and the minimum refractive index of the $i^{th}$ region respectively, and $n_{max(i+1)}$ and $n_{min(i+1)}$ are the maximum refractive index and the minimum refractive index of the (i+1)th region respectively.

11. The man-made composite material of claim 10, wherein the maximum refractive indices and the minimum refractive indices of any two adjacent ones of the regions satisfy: $n_{max(i)} - n_{min(i)} = n_{max(i+1)} - n_{min(i+1)}$.

12. The man-made composite material of claim 11, wherein the maximum refractive indices and the minimum refractive indices of any three adjacent ones of the regions satisfy: $n_{max(i+1)} - n_{min(i)} > n_{max(i+2)} - n_{min(i+1)}$.

13. The man-made composite material of claim 10, wherein a refractive index of the $i^{th}$ region satisfies:

$$n_i(\theta) = \frac{\sin\theta}{d \times \theta}\left(n_{max(i)} \times d + s - \frac{s}{\cos\theta}\right),$$

where θ is an angle formed between a line connecting the radiation source to a point on the bottom surface of the $i^{th}$ region and a line perpendicular to the man-made composite material.

14. The man-made composite material of any of claim 1, wherein the man-made composite material is provided with an impedance matching layer at two sides thereof respectively.

15. A man-made composite material antenna, comprising a man-made composite material and a radiation source disposed at a focus of the man-made composite material, wherein the man-made composite material has a thickness and is divided into a plurality of regions; an electromagnetic wave is incident on a first surface of the man-made composite material and exits from a second surface of the man-made composite material opposite to the first surface; an $i^{th}$ region is one of the plurality of regions, and i is a positive integer and selected from a group consisted of 1, 2, 3, . . . , etc.;

an intersection between the $i^{th}$ region and the first surface is a bottom surface of the $i^{th}$ region, an intersection between the $i^{th}$ region and the second surface is a top surface of the $i^{th}$ region; a line connecting the radiation source to a point on the bottom surface of the $i^{th}$ region and a line perpendicular to the man-made composite material form an angle θ therebetween, which uniquely corresponds to a curved surface in the $i^{th}$ region, the curved surface to which the angle θ uniquely corresponds is sandwiched between the bottom surface and the top surface of the $i^{th}$ region, a set of points on the bottom surface of the $i^{th}$ region that have the same angle θ forms a boundary of the curved surface to which the angle θ uniquely corresponds; each point on the curved surface to which the angle θ uniquely corresponds has a same refractive index; the curved surface to which the angle θ uniquely corresponds has a generatrix which extends along a direction of the thickness of the man-made composite material and between the bottom surface and the top surface of the $i^{th}$ region, the curved surface to which the angle θ uniquely corresponds is formed by rotating the generatrix about the line perpendicular to the man-made composite material; and refractive indices of each of the regions decrease gradually as the angle θ increases.

16. The man-made composite material antenna of claim 15, wherein a line connecting the radiation source to a point on an outer circumference of the bottom surface of the $i^{th}$ region and the line perpendicular to the man-made composite material form an angle θi therebetween, and the closer the region is to a center of the man-made composite material, the smaller the value of i will be; wherein a generatrix of a curved surface to which the angle θi corresponds has an arc length $c(\theta_i)$, and the arc length $c(\theta_i)$ and the angle θi satisfy the following equations:

$$c(\theta_i) = \frac{\lambda}{n_{max(i+1)} - n_{min(i)}};$$

$$s \times \left(\frac{1}{\cos\theta_i} - \frac{1}{\cos\theta_{i-1}}\right) = c(\theta_{i-1})n_{max(i)} - c(\theta_i)n_{min(i)},$$

where, $\theta_0 = 0$, $c(\theta_0) = d$; s is a distance from the radiation source to the man-made composite material; d is the thickness of the man-made composite material; λ is a wavelength of the electromagnetic wave, $n_{max(i)}$ and $n_{min(i)}$ are the maximum refractive index and the minimum refractive index of the $i^{th}$ region respectively, and $n_{max(i+1)}$ is the maximum refractive index of the (i+1)th region.

17. The man-made composite material antenna of claim 16, wherein the maximum refractive indices and the minimum refractive indices of any two adjacent ones of the regions satisfy: $n_{max(i)} - n_{min(i)} = n_{max(i+1)} - n_{min(i+1)}$.

18. The man-made composite material antenna of claim 17, wherein the maximum refractive indices and the minimum refractive indices of any three adjacent ones of the regions satisfy: $n_{max(i+1)} - n_{min(i)} > n_{max(i+2)} - n_{min(i+1)}$.

19. The man-made composite material antenna of claim 17, wherein a refractive index of the $i^{th}$ region satisfies:

$$n_i(\theta) = \frac{1}{c(\theta)}\left(n_{max(i)} \times d + s - \frac{s}{\cos\theta}\right),$$

where d is the thickness of the man-made composite material, θ is an angle formed between a line connecting the radiation source to a point on the bottom surface of the $i^{th}$ region and a line perpendicular to the man-made composite material, and $c(\theta)$ is an arc length of a generatrix of the curved surface to which the angle θ corresponds.

20. The man-made composite material antenna of claim 15, wherein the generatrix of the curved surface is a parabolic arc, an elliptical arc or a circular arc.

* * * * *